June 8, 1965  E. HONORE ETAL  3,188,454
SIMULTANEOUS LINEAR EQUATION COMPUTER SYSTEMS
Filed July 13, 1959  4 Sheets-Sheet 1
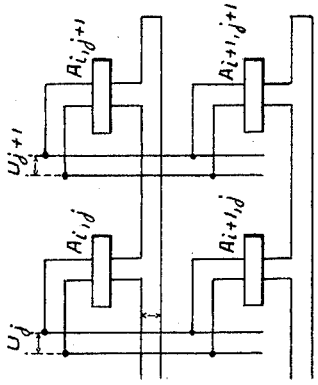
FIG. 3
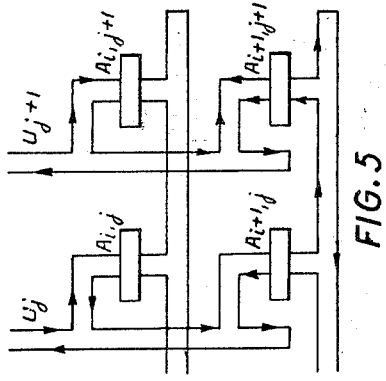
FIG. 5
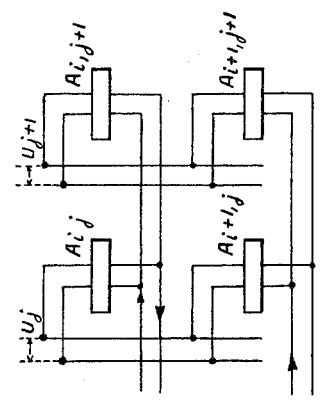
FIG. 2
FIG. 4
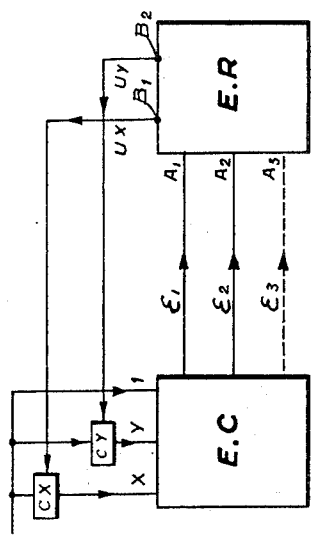
FIG. 1

United States Patent Office 3,188,454
Patented June 8, 1965

3,188,454
SIMULTANEOUS LINEAR EQUATION
COMPUTER SYSTEMS
Etienne Honore, Emile Torcheux, and Jean Tubeuf, Paris,
France, assignors to Societe Marocaine de Recherches,
d'Etudes et de Developpements "Somarede," a corporation of Morocco
Filed July 13, 1959, Ser. No. 826,651
Claims priority, application France, July 11, 1958,
770,091
12 Claims. (Cl. 235—180)

The present invention relates to simultaneous linear equation computer systems comprising $n$ equations with $p$ unknowns of the type, $$a_{11}x_1 + a_{12}x_2 + a_{13}x_3 \ldots a_{1p}x_p + s_1 = 0$$
$$a_{12}x_1 + a_{22}x_2 + a_{23}x_3 \ldots a_{2p}x_3 + s_2 = 0$$
$$* \quad * \quad * \quad * \quad *$$
$$a_n x_1 + a_{n2}x_2 + a_{n3}x_3 \ldots a_{np}x_p + s_n = 0$$

For a better understanding of the invention the same will be described with reference to a set of two equations with two unknowns, of the type $$a_1 x + b_1 y + s_1 = 0$$
$$a_2 x + b_2 y + s_2 = 0$$

It will readily appear that the system according to the invention can be used for solving sets of any number of linear equations, even though there are more equations than unknowns.

More particularly, the invention relates to equation computer systems wherein the unknown values of the equations are simulated by electrical magnitudes and which comprise feedback loops wherein these magnitudes are used for providing error signals which serve for adjusting these electrical magnitudes until no error signals appear at all, i.e. until the equations are made equal to zero, thus providing the values of the roots of the equations.

The invention provides as many devices as there are unknowns for the generation of the electric magnitudes, currents or voltages, which simulate the unknowns. These devices, which will be called Generators, have feedback loops for adjusting the values of these magnitudes to the value of the roots of the equations. The feedback loop essentially comprises an Error Calculator which calculates the amount by which the equation values differ from zero upon incorporation therein of the above magnitudes. Error signals are thus provided, each of which is a function of one of the equations of the system. The error signals are fed to a Switcher which, starting from the error signals, provides further signals each of which is a function of one unknown only. The output signals of the Switcher are used for adjusting the value of the magnitudes provided by the Generators and for making them equal to the roots of the equations. When the system is in a balanced state, i.e. when the error signals are equal to zero, the magnitudes respectively generated by the generators simulate the roots of the set of equations which is thus solved.

The invention will be better understood from the following description taken in conjunction with the appended drawing, given solely by way of example and wherein, FIG. 1 is a block diagram of a system according to the invention;

FIGS. 2, 3, 4 and 5 show, very diagrammatically, various embodiments of the switching device comprised in the system of FIG. 1 and intended for resolving a system of $n$ equations;

The same reference numerals indicate the same elements throughout the drawing.

Figure 6:
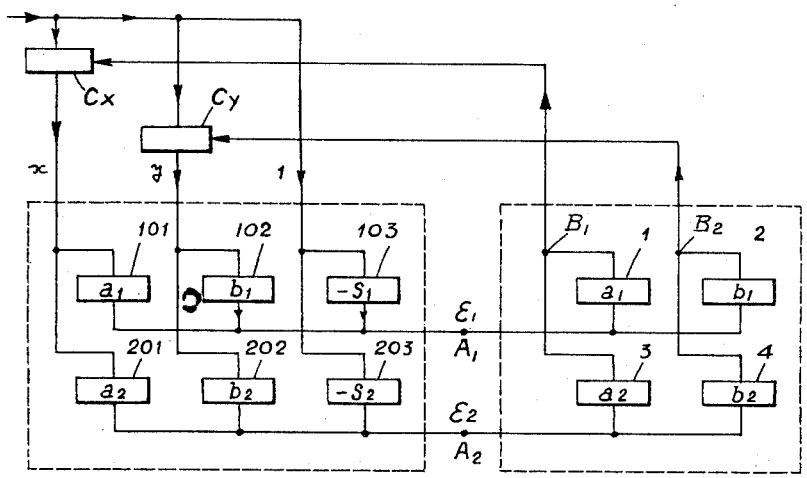
FIGS. 6, 7 and 8 show, very diagrammatically, three embodiments of systems according to the invention.

The system shown in FIG. 1 is capable of solving an equation set of the type, $$a_1 x + b_1 y + s_1 = 0 \qquad (1)$$
$$a_2 x + b_2 y + s_2 = 0$$

i.e. a system of two linear equations with two unknowns $x$ and $y$.

This system builds up a feedback assembly. It comprises as many generators $Cx$, $Cy$ as there are unknowns in the set of equations to be solved. These generators generate electrical magnitudes, for example voltages, which simulate the roots of the set of Equation 1. The root values provided by Generators $Cx$ and $Cy$ are controlled by a feedback loop. This feedback loop comprises an error calculator assembly E.C. and a switcher assembly E.R. The error calculator assembly simulates the equations to be solved and provides as many error signals which are functions of all the unknowns as there are equations until the right root values are incorporated into the simulated equations. The switcher assembly E.R. receives the error signals and switches the error signal component terms thereof into different channels $B_1$ and $B_2$, each channel receiving the terms which are functions of the same unknown. The respective outputs of these channels are used for respectively controlling the corresponding root generators. For the sake of clarity, the three main elements, the respective functions of which have been briefly outlined hereinabove, will be termed hereinafter as the Generators, the Error Calculator and the Switcher.

A voltage value 1 taken as unity is applied to one input of generators $Cx$ and $Cy$ and control magnitudes, $Ux$ and $Uy$, provided by the Switcher, are respectively applied to another input thereof and are used to adjust the initially arbitrary voltage values $x$, $y$, simulating the roots of the set of equations to be solved, which appear at the output of the generators. Voltages 1, $x$ and $y$ are fed to different inputs of the Error Calculator. The structure of the Generators is such that values $x$, $Ux$, $y$ and $Uy$ are respectively connected by relations:

$$\frac{dx}{dt} = -\frac{Ux}{k}, \frac{dy}{dt} = -\frac{Uy}{x} \qquad (2)$$

where $k$ designates a constant, which is, preferably, the same for all the Generators, and $t$ the time.

The structure of the Error Calculator is such that it provides at its two outputs two error signals, namely $$\epsilon_1 = a_1 x + b_1 y + s_1 \qquad (3)$$
$$\epsilon_2 = a_2 x + b_2 y + s_2$$

these signals becoming null when the equations are solved and voltages $x$ and $y$, provided by the Generators, exactly simulate the roots of the equations.

Signals $\epsilon_1$ and $\epsilon_2$ are respectively applied to the inputs $A_1$ and $A_2$ of Switcher E.R. The structure of Switcher E.R. is such that control magnitudes $Ux$ and $Uy$ are collected at the respective outputs $B_1$, $B_2$ thereof.

Actually the Switcher is the most vital portion of the system. The idea of solving sets of simultaneous equations by providing electric magnitudes simulating the unknowns of these equations, computing the value of the equations with these magnitudes incorporated into these equations and providing some kind of feedback loop in which the error magnitudes thus obtained are used to adjust the values simulating the unknowns for cancelling the error magnitudes is not believed to be new in itself. While it is believed that the Generators and the Error Calculator of the present invention are different from the prior art, the function they perform is not original in itself.

On the contrary, the very function performed by the Switcher is entirely original. The Switcher receives error signals which are functions of several unknowns in this case of $x$ and $y$, i.e., comprise terms in $x$ and terms in $y$. The Switcher then performs the surprising operation of switching these terms along different channels such that, at its output, control magnitudes appear which are functions of one unknown only and can then be used as reaction magnitudes for adjusting the values $x$ and $y$ provided by the Generators, until the error signals are cancelled, the root values of $x$ and $y$ being thus determined.

The Switcher is preferably built up from quadripoles or four terminal networks such as those described, for example, in the United States Patent 2,785,853, issued to the applicants March 18, 1957, in the copending applications Serial No. 709,383, now U.S. Patent 3,127,555, and Serial No. 709,391, now abandoned, filed by the applicants January 16, 1958, respectively for "Improvements in or Relating to Transformers for Electronic Computers" and "Improvements in Analog Computer Circuits."

Since such quadripoles are well known from the above patent and patent applications, there is no need of describing them in detail. Broadly, such quadripoles comprise two inputs and two outputs respectively interconnected by reactances of a predetermined sign, while other reactances of an opposite sign connect each input terminal to each output terminal. The respective values of these reactances are such that the quadripoles become series resonant when the output or the input terminals are shorted. The reactances hereinabove referred to as reactances of opposite sign are variable, but their respective variations are tied in such a way that their mathematical sum remains constant. Such quadripoles have very low input impedance when a high output impedance is coupled across their output terminals. They are practically perfect voltage-to-current or current-to-voltage transformers, the transformation taking place with transformation coefficients whose value depends on the adjustments of the reactances connecting the input terminals to the output terminals, i.e., of the characteristic impedance or admittance of the quadripole. It is to be understood that the term current is used to designate currents delivered under practically no impedance and the term voltage is used to designate voltages delivered under a practically infinite impedance. These quadripoles are thus practically reversible. If voltage U is applied to one pair of terminals, a current AI appears across the other pair of terminals and if the current AI is applied to this other pair of terminals, voltage U appears across said one pair of terminals. A quadripole of this type is shown, for example, in FIG. 2 of the above mentioned U.S. Patent 2,785,853. Such a quadripole comprises two input terminals $11a$ and $11b$ and two output terminals $12a$ and $12b$. A coil 13 having an admittance equal to $-k$ is connected across the input terminals $11a$ and $11b$ and a coil 14 of the same admittance across the output terminals $12a$ and $12b$.

Each of the two input terminals $11a$ and $11b$ is symmetrically connected to both of the output terminals $12a$ and $12b$ by two variable capacitors or coils, one 15 having an admittance equal to $(k+X)$ and the other 16 having an admittance $(k-X)$. It may be easily demonstrated that if a voltage U is applied to one pair of terminals $11a$–$11b$, a current I appears across the other pair $12a$–$12b$, I being equal $$I=XU$$

and vice versa, if a voltage V is applied across terminals $12a$–$12b$, a current $I=XV$ appears across terminals $11a$–$11b$. X is variable and can be adjusted, by controlling capacitances 15 and 16 as shown, FIG. 2 of the cited patent. X is the transformation ratio of the quadripole.

This quadripole is a perfect current-to-voltage, or voltage-to-current transformer.

Of course, any other four terminal network which is to a sufficient degree reversible, i.e., a prefect transformer of electrical magnitudes, i.e., of voltages or currents into currents or voltages, can also be used. However, the four terminal networks of the type outlined above are preferred.

A Switcher used in a system according to the invention can be considered as ideally building up a matrix representing the set of equations to be solved, this matrix comprising $n$ quadripoles in the horizontal direction and $p$ quadripoles in a direction perpendicular to the first direction, the signification of $p$ and $n$ being the same as in the set of Equations 1.

With the above considerations in mind, it will be readily seen that there are generally four possible alternative arrangements of the adjustable quadripoles building up the Switcher in accordance with the nature of electrical magnitudes applied to the Switcher input and collected at the Switcher output.

The four possible cases correspond to:
(a) Input currents and output voltages (FIG. 2);
(b) Input voltages and output voltages (FIG. 3);
(c) Input currents and output currents (FIG. 4);
(d) Input voltages and output currents (FIG. 5).

FIGS. 2 to 5 show those quadripoles which are common to the columns $j$ and $j+1$ and to the lines $i$ and $i+1$ of the matrix.

In the embodiment shown there are two unknowns, $x$ and $y$, and accordingly two error currents at the output of the Error Calculator and two control voltages at the output of the Switcher.

It is seen in the case of FIG. 2 that the input or secondary terminals of the quadripoles of the same line are connected in parallel across the corresponding input terminals of the Switcher and that the output or primary terminals of the same column are connected in parallel across the corresponding terminals of the Switcher.

The operation of the Switcher shown in FIG. 2, and the same will be true for all the other embodiments, is not so easy to understand.

Considering for example output terminals $B_1$ of the Switcher of FIG. 1, which is entirely similar to the Switcher portion shown in FIG. 2 since the set of equations to be solved comprises in the case of FIG. 1 only the two Equations 1, it is readily seen that the voltage appearing across these terminals results from the transformation of error currents $\epsilon_1$ and $\epsilon_2$ which are both functions of $x$ and $y$. Through the action of the Switcher, the voltage appearing across terminals $B_1$ is the driving voltage of the feedback loop of generator $Cx$.

This is far from being evident and is rather difficult to explain if the usual direction, i.e., the direction from the input to the output of the Switcher, is considered. The same fact becomes, however, entirely evident, if the reverse direction is considered. For resolving the set of Equations 1 the characteristic impedances or transfer coefficients of quadripoles $$A_{ij},\ A_{i,\ j+1},\ A_{i+1,\ j},\ A_{i+1,\ j+1}$$

are adjusted to values $a_1$, $b_1$ and $a_2$, $b_2$ respectively. If voltages $U_x$ and $U_y$ are respectively fed to pairs of terminals $B_1$ and $B_2$, obviously the currents collected at terminals $A_1$ and $A_2$ will be:

$$\epsilon_1=a_1U_x+b_1U_y$$
$$\epsilon_2=a_2U_x+b_2U_y$$

The quadripoles being entirely reversible, if currents $$\epsilon_1=a_1U_x+b_1U_y$$
$$\epsilon_2=a_2U_x+b_2U_y$$

are fed two terminals $A_1$ and $A_2$ respectively, voltages $U_x$ and $U_y$ will appear across terminals $B_1$ and $B_2$ respectively.

Generally speaking, $a_{ij}$ being the transformation ratio of a quadripole, $A_{ij}$, one can write:

$$\epsilon_i = \sum_{j=1}^{j=p} a_{ij} U_j \quad (4)$$

The second member of this relation can also comprise a coefficient $\lambda$ in order to take into account the matching devices at the input at the output of the Switcher.

Considering the four quadripoles $A_{ij}$, $A_{i, j+1}$, $A_{i+1, j}$ and $A_{i+1, j+1}$ of FIG. 2, if their respective transformation ratios are $a_1$, $a_2$, $b_1$ and $b_2$, the following relations are readily established $$\lambda_1 \epsilon_1 = a_1 V_x + b_1 V_y$$
$$\lambda_2 \epsilon_2 = a_2 V_x + b_2 V_y \quad (5)$$

Assuming $x_s$ and $y_s$ to be the roots of the set of two Equations 1, i.e.

$$a_1 x_s + b_1 y_s - s_1 = 0$$
$$a_2 x_s + b_2 y_s - s_2 = 0 \quad (6)$$

signals $\epsilon_1$ and $\epsilon_2$ are equal to zero.

Let $x_0$ and $y_0$ be the starting values of the voltages respectively generated by Generator $C_x$ and $C_y$ and $x_1$ and $y_1$ the instantaneous values of said voltages. Once $x_0$ and $y_0$ are applied to the assembly E.C., errors signals $\epsilon_1$ and $\epsilon_2$ appear at the input of the Switcher.

These signals are $$\epsilon_0^1 = a_1 x_0 + b_1 y_0 + s_1$$
$$\epsilon_0^2 = a_2 x_0 + b_2 y_0 + s_2 \quad (7)$$

$x$ and $y$ vary as functions of time and consequently, so do $\epsilon_1$ and $\epsilon_2$. These signals provide at the output of the Switcher, voltages $U_x$ and $U_y$ such that $$\lambda \epsilon_1 = a_1 U_x + b_1 U_y$$
$$\lambda \epsilon_2 = a_2 U_x + b_2 U_y$$

Calculating the values of $\epsilon_1$ and $\epsilon_2$ as a function of $x_s$ and $y_s$ and substituting, it appears that $$a_1 U_x + b_1 U_y = \lambda a_1 (x - x_s) + \lambda b_1 (y - y_s)$$
$$a_2 U_x + b_2 U_y = \lambda a_2 (x - x_s) + \lambda b_2 (y - y_s) \quad (8)$$

from which it follows that $$U_x = \lambda(x - x_s)$$
$$U_y = \lambda(y - y_s) \quad (9)$$

These equations show that voltages, or more generally control electric magnitudes, $U_x$ and $U_y$ are proportional to the instantaneous differences $x - x_s$ and $y - y_s$, i.e., that the gains of the different feedback loops are constant and equal to $\lambda$.

It also appears in view of Relation 2 that $$\frac{dx}{dt} = \frac{\lambda}{K}(x - x_s)$$

$$\frac{dy}{dt} = \frac{\lambda}{K}(y - y_s)$$

i.e., that $$x - x_s = (x_0 - x_s) e^{-\frac{\lambda}{K} \cdot t}$$

$$y - y_s = (y_0 - y_s) e^{-\frac{\lambda}{K} \cdot t} \quad (10)$$

Accordingly, after a comparatively short time, $x$ assumes the value $x_s$ and $y$ the value $y_s$, and the equations are solved.

In the case just described, currents are applied at the input and voltage collected at the output of the quadripoles of the Switcher. The quadripoles, described in the above mentioned patent and co-pending patent applications, which, if closed on an infinite impedance, have a zero input impedance are particularly suitable for such an arrangement.

In the case of FIG. 3, voltages are applied at the input and appear at the output. This calls for voltage transformers which should of course be as perfect as possible in the sense that they should have as small internal losses as possible, i.e., be perfectly reversible. The general structure is the same as in FIG. 2 except that at the input four terminal networks, such as $A_{i+1, j}$ and $A_{i+1, j+1}$ are connected in series.

FIGS. 4 and 5 correspond respectively to current-to-current and voltage-to-current transformations respectively. The connection at the input is the same as in FIG. 2 and at the output the same as in FIG. 3.

The system shown in FIG. 1 is balanced when $\epsilon_1 = \epsilon_2 = 0$ and at this stage no exchange of energy will take place between the Error Calculator and the Switcher. Accordingly, the precision of the system depends for all practical purposes on that of the Error Calculator only and not on that of the Switcher.

If $n$ is greater than $p$, i.e., if there are more equations than unknowns, these equations being not compatible, if for example a third equation $a_3 x + b_3 y - s_3 = 0$ is added to the system (3), it may be shown that control magnitudes $U_x$ and $U_y$ cancel for values $x_p$ and $y_p$ such that the sum $$\mu_1 (a_1 x_p + b_1 y_p - S_1)^2 + \mu_2 (a_2 x_p + b_2 y_p - S_2)^2$$
$$+ \mu_3 (a_3 x_p + b_3 x_p + b_3 y_p - s_3)^2 \quad (15)$$

is minimum, the coefficients $\mu_1$, $\mu_2$, $\mu_3$ taking into account various losses of the Switcher. Thus a compromise is made between conditions which in themselves are incompatible.

Some embodiments of equation calculators for sets of $n$ equations according to the invention will now be described in greater detail by way of example. For the sake of simplicity $\lambda$ will be assumed to be equal to 1. The diagrams used are of the unifilar type.

In FIG. 6, the Switcher is the same as in FIG. 2 the respective characteristic admittances of the quadripoles being $a_1$, $a_2$, $b_1$ and $b_2$. The Error Calculator comprises quadripoles 101, 103, 102 having respective admittances $a_1$, $b_1$, $-s_1$ and quadripoles 201, 202, 203 having respective admittances $a_2$, $b_2$, $-s_2$.

The inputs of quadripoles or four terminal networks 101, 201 receive from generator $C_x$ a voltage $x$, the inputs of quadripoles 102, 202 receive from generator $C_y$ a voltage $y$, whereas, the inputs of quadripole 103, 203 receive voltage values 1 taken as unity.

The outputs of quadripoles 101, 102, 103 are connected in parallel to input $A_1$ of the Switcher and the outputs of quadripoles 201, 202, 203 are connected in parallel to input $A_2$ thereof. As explained above, Error Calculator thus simulates the two polynomes (1) and calculates the two quantities by which these polynomes differ from zero, i.e. the two error magnitudes:

$$\epsilon_1 = a_1 x + b_1 y - s_1 \quad (3)$$
$$\epsilon_2 = a_2 x + b_2 y - s_2$$

The characteristic admittances of each quadripole comprised in the Switcher is the same as that of the corresponding quadripole of the Error Calculator, i.e. of that which is coupled to the Switcher quadripole and to the same Generator as this quadripole.

The operation of the assembly has already been described.

Figure 7:
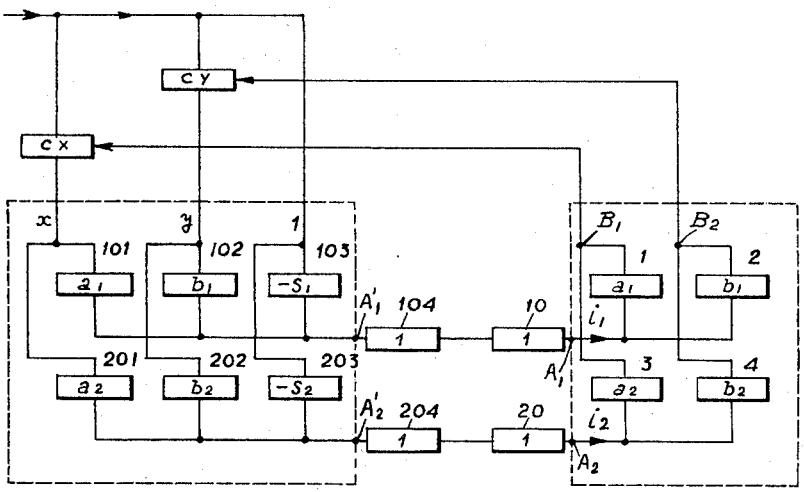

Device of FIG. 7 is entirely similar to that of FIG. 6, except that elements 104 and 10, 204 and 20 are inserted between the Error Calculator and the Switcher. Elements 104 and 10, 204 and 20 build up respectively two multiplying cells, according to the above mentioned cited Patent 2,785,853. These cells have a constant multiplying factor independent of the system to be solved. This factor is tied to the factor $\lambda$ of Equations 9, and is conveniently choosen in accordance with the teaching of this Patent by trial and error, for giving to the different loops and appropriate gain.

Figure 8:
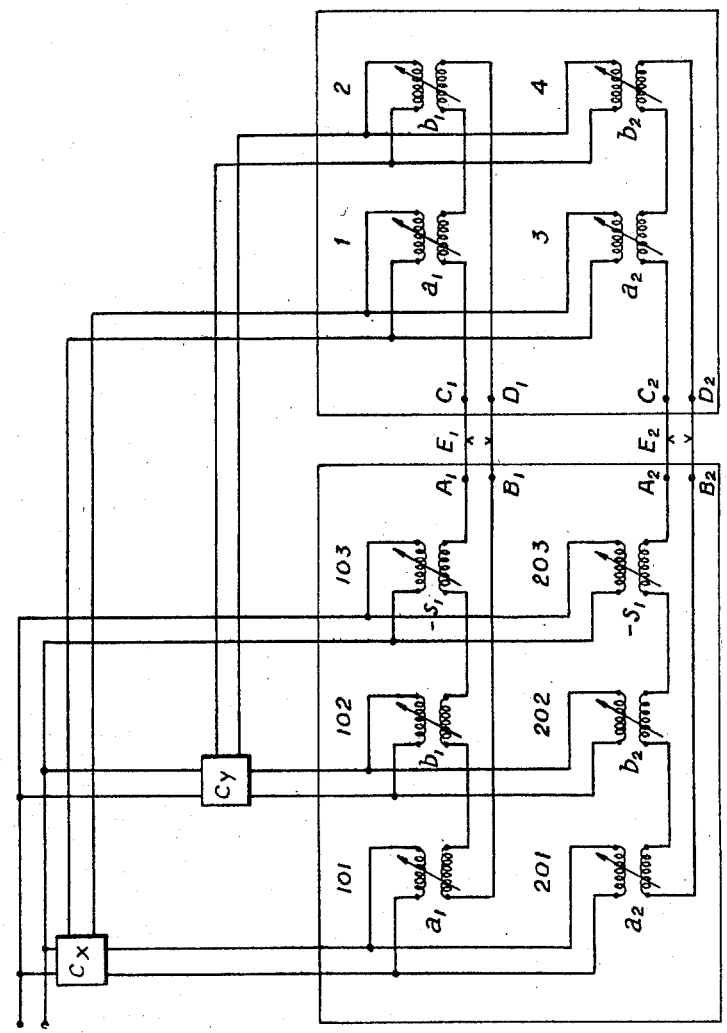

FIG. 8 shows an equation calculator embodying the switcher of FIG. 3.

It is built with transformers and the Switcher operates on the basis of voltage-to-voltage transformation.

The Error Calculator comprises two sets of three transformers 101, 102, 103 and 201, 202 and 203 with respective transformation ratios $a_1$, $b_1$, $s_1$, and $a_2$, $b_2$, $s_2$.

The primary windings of transformers 101 and 201 receive voltage $x$, those of transformers 102 and 202 receive voltage $y$ and those of transformers 103 and 203 a voltage value taken as unity. The secondary windings of transformers 101, 102 and 103 provide signal $\epsilon_1$, and the secondary windings of transformers 201, 202 and 203 provide signal $\epsilon_2$.

The Switcher comprises two sets of two transformers 1, 2 and 3, 4 coupled as shown in FIG. 3. Transformers 1 and 2 have respective transformation ratios $a_1$ and $a_2$ and transformers 3 and 4 transformation ratios $a_2$ and $b_2$.

The primary windings of transformers 1 and 3 are coupled to the outputs of the secondary windings of transformers 101, 102, 103 to receive signal $\epsilon_1$. The primary windings of transformers 3 and 4 are coupled to the outputs of the secondary windings of transformers 201, 202, 203.

The secondary windings of transformers 1 and 2 are coupled in parallel to generator $Cx$, those of the transformers 3 and 4 to generator $Cy$.

The operation is as described above.

Figure 9:
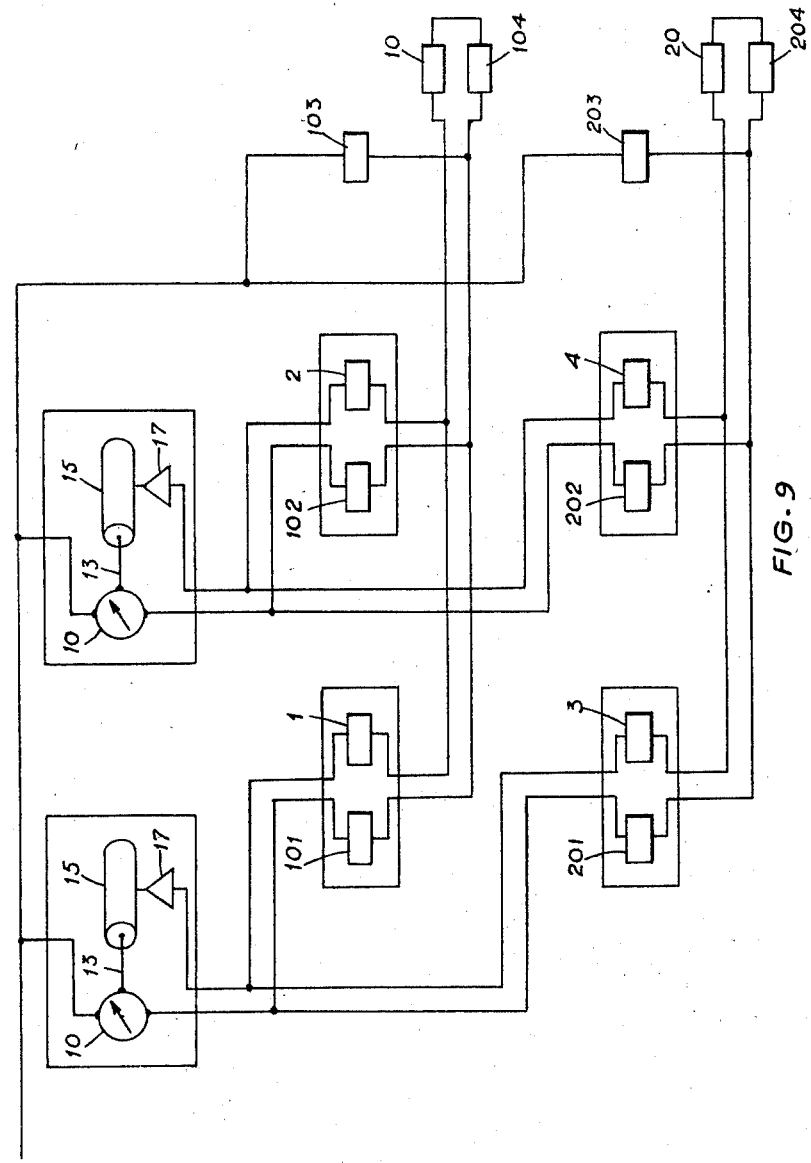
FIG. 9 shows in more detail the system of FIG. 7.

FIG. 9 shows in more detail a system according to the invention. It is entirely similar to that of FIG. 7. It may be seen that the Error Calculator and the Switcher have been integrated into each other, the quadripoles having the same characteristic impedances or transformation ratios having been put in close proximity of each other in such a way that this impedance or ratio can be adjusted simultaneously in both. With this in mind, it will be readily seen that the wiring is exactly the same in FIG. 7 and in FIG. 9.

Generators $Cx$ and $Cy$ each comprise an amplifier 17 which is fed by the corresponding output of the Switcher and drives a servo mechanism 15, of any suitable type having a mechanical output whose speed is proportional to the corresponding output voltage of the Switcher.

This servo-mechanism may be for example of the type described in the U.S. Patent 3,001,115 for "Improvements in Translation Operated Servo-Mechanism," filed by the applicants December 31, 1958.

Servo 15 controls, for example, through a shaft 13 the multiplying factor of a multiplier circuit 10 such as described in the above mentioned Patent 2,785,853. This multiplier circuit receives from the mains not shown a unity voltage value and delivers an output voltage proportional to the instantaneous value of the corresponding unknown $x$ or $y$. When the servo comes to a stop, the system being in equilibrium, the values of $x$ and $y$ can be read on a graduated dial incorporated in device 10 and the roots of the set of Equations 1 are thus found.

The values of the coefficients $a_1$, $a_2$, $b_1$, $b_2$, $s_1$ and $s_2$ may be adjusted manually, each time a set of equations is to be solved.

The invention is of course not limited to the embodiments described and shown which have been given solely by way of example. In particular, as already mentioned, it is obvious that systems of more than two equations, with a corresponding number of unknowns, can be solved, by merely increasing the number of generators and the number of lines and columns in the Error Calculator and in the Switcher.

What is claimed is:

1. An equation computer for solving a system of $n$ linear equations with $p$ unknowns of the type $$a_{11}x_1 + \ldots + a_{1j}x_j + \ldots a_{1p}x_p - S_1 = 0$$
$$* \quad * \quad * \quad * \quad *$$
$$a_{i1}x_1 + \ldots + a_{ij}x_j + \ldots + a_{ip}x_p - S_i = 0$$
$$* \quad * \quad * \quad * \quad *$$
$$a_{n1}x_1 + \ldots + a_{nj}x_j + \ldots + a_{np}x_p - S_p = 0$$

comprising: $p$ generator means for providing adjustable electric magnitudes respectively simulating said unknowns, said means having respective control inputs for receiving control input voltages and outputs; a feedback loop, associated with said generator means, for adjusting the values of said magnitudes to make them respectively equal to the roots of said equations; in said feedback loop, error calculating means coupled to said outputs for calculating the $n$ respective values of said $n$ equations upon respective incorporation therein of said electric magnitudes and having $n$ outputs, thus providing $n$ error signals; $n$ sets of $p$ reversible four terminal networks, each network having inputs and outputs comprising respectively two secondary terminals, and two primary terminals, the networks of each set having respective transformation ratios equal to the respective coefficients of one equation of the system, the primary terminals of the network of each set being respectively coupled in parallel with the primary terminals of one network in each other set, to said control input of one of said generator means; the primary terminals of said sets being interconnected for obtaining a signal proportional to the sum of said control voltages multiplied respectively by the transformation ratios of said networks, and for feeding said sum signal to said $n$ outputs of said error calculator.

2. An equation computer for solving a system of $n$ linear equations numbered from one to $n$, of the type $$a_{11}x_1 + \ldots + a_{1j}x_j + \ldots + a_{1p}x_p - S_1 = 0$$
$$* \quad * \quad * \quad * \quad *$$
$$a_{i1}x_1 + \ldots + a_{ij}x_j + \ldots + a_{ip}x_p - S_i = 0$$
$$* \quad * \quad * \quad * \quad *$$
$$a_{n1}x_1 + \ldots + a_{nj}x_j + \ldots + a_{np}x_p - S_p = 0$$

said equation having $p$ unknowns numbered from one to $p$, the computer comprising, $p$ generator means, numbered from one to $p$, for providing adjustable electric magnitudes, each simulating the unknown having the same number, said means having respective control inputs for receiving control input voltages and outputs; a feedback loop, associated with said generator means, for adjusting the values of said magnitudes to make them respectively equal to the roots of said equations; in said feedback loop, error calculating means coupled to said outputs for calculating the $n$ respective values of said $n$ equations upon respective incorporation therein of said electric magnitudes and having $n$ outputs, thus providing $n$ error signals, numbered from one to $n$, each error signal corresponding to the equation having the same number $n$ sets, numbered from one to $n$, of $p$ reversible four terminal networks, numbered from one to $p$, each network having inputs and outputs comprising respectively two secondary and two primary terminals, the transformation ratio of the network numbered $j$ in the set numbered $i$ being equal to the coefficient $a_{ij}$, $i$ and $j$ being respectively all the integers comprised between 1 and $n$, 1 and $p$, the primary terminals of the networks bearing the same number in each set being parallely coupled to the control input of said generator means bearing the same number, the primary terminals of the networks of each set being interconnected for obtaining a signal proportional to the sum of said control voltages multiplied respectively by said transformation ratios of said networks, and for feeding said sum signal to said outputs of said calculators bearing the same number.

3. An equation computer for solving a system of $n$ linear equations numbered from one to $n$, with $p$ unknowns, numbered from one to $p$, comprising: $p$ generator means, numbered from one to $p$, for providing adjustable electric magnitudes, each simulating the unknown having the same number, said means having respective control inputs for receiving respective control input voltage and outputs; a feedback loop associated with said generator means for adjusting the values of said magnitudes to make them respectively equal to the roots of said equations; in said feedback loop, error calculating means comprising $n$ first sets, numbered from one to $n$, of $p$ reversible four terminal networks having respective inputs and outputs, $n$ common outputs, numbered from one to $n$, each coupled to the outputs of said networks of that set, which has the same number, the inputs of said networks being respectively coupled to said generator means having the same number, the respective transformation coefficients of said networks being adjustable in each set for simulating the respective coefficient values of said unknowns in the equation having the same number as said set, for calculating the $n$ respective values of said $n$ equations upon respective incorporation therein of said electric magnitudes, thus providing $n$ error signals, numbered from one to $n$; $n$ second sets, numbered from one to $n$, of $p$ reversible four terminal networks, numbered from one to $p$, each network having inputs and outputs comprising respectively two secondary and two primary terminals, the transformation ratio of the network numbered $j$ in the set numbered $i$ being equal to the coefficient $a_{ij}$, $i$ and $j$ being respectively all the integers comprised between 1 and $n$, 1 and $p$, the primary terminals of the networks bearing the same number in each set being parallely coupled to the control input of said generator means bearing the same number, the primary terminals of the networks of each set being interconnected for obtaining a signal proportional to the sum of said control voltages multiplied respectively by said transformation ratios of said networks and for feeding said sum signal to said outputs of said calculators bearing the same number.

4. An equation computer for solving a system of $n$ linear equations, numbered from one to $n$, with $p$ unknowns numbered from one to $p$, comprising: $p$ generator means, numbered from one to $p$, for providing adjustable electric magnitudes, each simulating the unknown having the same number, said means having respective control inputs and outputs; a feedback loop associated with said generator means for adjusting the values of said magnitudes to make them respectively equal to the roots of said equations; in said feedback loop, error calculating means comprising $n$ first sets, numbered from one to $n$, of $p$ reversible four terminal networks numbered from one to $p$ having respective inputs and outputs, $n$ common outputs numbered from one to $n$ respectively coupled to the outputs of said networks of that of said set, which has the same number, the inputs of said networks being respectively coupled to said generator means having the same number, the respective characteristic admittances of said networks being adjustable in each set, for simulating the respective coefficient values of said unknowns in the equation having the same number as said set for calculating the $n$ respective values of said $n$ equations upon respective incorporation therein of said electric magnitudes, thus providing $n$ error signals numbered from one to $n$; $n$ second sets, numbered from one to $n$, of $p$ reversible four terminal networks, numbered from one to $p$, each network having inputs and outputs, the inputs of the networks of said second sets being respectively connected in parallel to said common outputs for respectively collecting said error signals having the same number and the outputs of each four terminal network in each set being coupled in parallel to the networks bearing the same number in each other said second set and to said control input of said generator means bearing the same number, the respective characteristic admittances of the networks of each of said second sets simulating the coefficients of the unknowns in the equation having the same number as said set.

5. An equation computer for solving a system of $n$ linear equations, numbered from one to $n$, with $p$ unknowns, numbered from one to $p$, comprising: $p$ generator means, numbered from one to $p$, for providing adjustable electric magnitudes each simulating the unknown having the same number, said means having respective control inputs and outputs; a feedback loop, associated with said generator means, for adjusting the values of said magnitudes to make them respectively equal to the roots of said equations; in said feedback loop, error calculating means comprising $n$ first sets, numbered from one to $n$, of $p$ reversible four terminal networks having respective inputs and outputs, $n$ common outputs, numbered from one to $n$, each coupled to the outputs of said networks of that of said sets which has the same number, the inputs of said networks being respectively coupled to said generator means having the same number, the respective transformation coefficients of said networks being adjustable in each set for simulating the respective coefficient values of said unknowns in the equation having the same number as said set, for calculating the $n$ respective values of said $n$ equations upon respective incorporation therein of said electric magnitudes, thus providing $n$ error signals, numbered from one to $n$; $n$ second sets, numbered from one to $n$, of $p$ adjustable transformers numbered from one to $p$, each transformer having inputs and outputs, the inputs of the transformers of said second set being respectively coupled in series to said common outputs having the same number for respectively collecting said error signals and the outputs of each transformer in each set being coupled in parallel to the transformer bearing the same number in each other set and to said control input of said generator means bearing the same number, the respective transformation ratios of the transformers of each of said second sets simulating the coefficients of the unknowns in the equation having the same number as said set.

6. An equation computer for solving a system, of $n$ linear equations, numbered from one to $n$, with $p$ unknowns, numbered from one to $p$, comprising: $p$ generator means, numbered from one to $p$, for providing adjustable electric magnitudes, each simulating the unknown having the same number, said means having respective control inputs and outputs; a feedback loop associated with said generator means for adjusting the values of said magnitudes to make them respectively equal to the roots of said equations; in said feedback loop, error calculating means coupled to said outputs for calculating the $n$ respective values of said $n$ equations, upon respective incorporation therein of said electric magnitudes, thus providing $n$ error signals, numbered from one to $n$, each error signal corresponding to the equation having the same number; $n$ sets numbered from one to $n$, of $p$ reversible transformers, numbered from one to $p$, each transformer having two inputs and two outputs, the inputs of each set being connected in series for respectively collecting said error signals having the same number and the outputs of each transformer network in each set being connected in parallel respectively with said control input of said generator means having the same number and with the transformers having the same number in each other set, the respective transformation ratios of said transformers respectively simulating the coefficients of the unknowns in the equation having the same number as said set.

7. An equation computer for solving a system, of $n$ linear equations, numbered from one to $n$, with $p$ unknowns, numbered from one to $p$, comprising: $p$ generator means, numbered from one to $p$, for providing adjustable electric magnitudes, each simulating the unknowns having the same number, said means having respective control inputs and outputs; a feedback loop associated with said generator means for adjusting the values of said magnitudes to make them respectively equal to the roots of said equations; in said feedback loop, error calculating means coupled to said outputs for calculating the $n$ respective values of said $n$ equations upon respective incorporation therein of said electric magnitudes, thus providing $n$ error signals, numbered from one to $n$ each error signal corresponding to the equation having the same number; $n$ sets numbered from one to $n$, of $p$ reversible four terminal networks numbered from one to $p$, each network having two inputs and two outputs, the inputs of each set being connected in series for respectively collecting said error signals having the same number and the outputs of each four terminal network in each set being connected in parallel respectively with said control input of said generator means having the same number and with the four terminal network having the same number in each other set, the respective characteristic admittances of said networks respectively simulating the coefficients of the unknowns in the equation having the same number as said set.

8. An equation computer for solving a system of $n$ linear equations, numbered from one to $n$, with $p$ unknowns, numbered from one to $p$, comprising: $p$ multiplier circuits having adjustable multiplier coefficients, respective inputs for receiving a reference voltage taken as unity and respective outputs for providing adjustable magnitudes respectively simulating the unknown having the same number; $p$ servomechanism means, numbered from one to $p$, having respective control inputs, for respectively controlling said coefficients in said multiplier circuits; a feedback loop associated with said multiplier circuits for providing control voltages for said servomechanism means for thereby adjusting the values of said adjustable magnitudes for respectively simulating the roots of said equations; in said feedback loop, error calculating means comprising $n$ first sets, numbered from one to $n$, of $p$ reversible four terminal networks, numbered from one to $p$, having respective inputs and outputs, common outputs, numbered from one to $n$, respectively coupled to the outputs of the networks of said set having the same number, the inputs of said networks being coupled to said generator means having the same number, the respective transformation coefficients of said networks beting in each set adjustable for simulating the respective coefficient values of said unknowns in the equation having the same number as said set for calculating the $n$ respective values of said $n$ equations upon respective incorporation therein of said electric magnitudes, thus providing $n$ error signals numbered from one to $n$; $n$ second sets, numbered from one to $n$, of $p$ reversible four terminal networks numbered from one to $p$, each network having inputs and outputs, the inputs of the networks of said sets being respectively coupled to said common outputs having the same number as said set for respectively collecting said error signals and the outputs of each four terminal network in each set being coupled to the network bearing the same number in each other set and to said control input of said servomechaism means bearing the same number, the respective transformation coefficients of the networks of each set simulating the coefficients of the unknowns in the equation having the same number as said set.

9. An equation computer for solving a system of $n$ linear equations, numbered from one to $n$, with $p$ unknowns, numbered from one to $p$, comprising: $p$ multiplier circuits having adjustable multiplier coefficients, respective inputs for receiving a reference voltage taken as unity and respective outputs for providing adjustable magnitudes respectively simulating said unknown having the same number; $p$ servomechanism means, numbered from one to $p$, having respective control inputs, for respectively controlling said coefficients in said multiplier circuits; a feedback loop associated with said multiplier circuits for providing control voltages for said servomechanism means for thereby adjusting the values of said adjustable magnitude for making them respectively equal to the roots of said equations; in said feedback loop, error calculating means comprising $n$ first sets, numbered from one to $n$, of $p$ reversible four terminal networks, numbered from one to $p$, having respective inputs and outputs, $n$ common outputs, numbered from one to $n$, respectively coupled to the outputs of the networks of said set having the same number, the inputs of said networks being coupled to said generator means having the same number, the respective transformation coefficients of said networks being in each set adjustable for simulating the respective coefficient values of said unknowns in the equation having the same number as said set for calculating the $n$ respective values of said $n$ equations upon respective incorporation therein of said electric magnitudes, thus providing $n$ error signals numbered from one to $n$; $n$ second sets, numbered from one to $n$, of $p$ reversbile four terminal networks numbered from one to $p$, each network having inputs and outputs, the inputs of the networks of said sets being respectively coupled in parallel to said common outputs for respectively collecting said error signals and the outputs of each four terminal network in each set being coupled in parallel to the network bearing the same number in each other set and to said control input of said servomechanism means bearing the same number, the respective characteristic admittances of the networks of each set simulating the coefficients of the unknowns in the equation having the same number as said set.

10. An equation computer for solving a system of $n$ linear equations, numbered from one to $n$, with $p$ unknowns, numbered from one to $p$, comprising: $p$ multiplier circuits having adjustable multiplier coefficients, respective inputs for receiving a reference voltage taken as unity and respective outputs for providing adjustable magnitudes respectively simulating said unknown having the same number; $p$ servomechanism means, numbered from one to $p$, having respective control inputs, for respectively controlling said coefficients in said multiplier circuits; a feedback loop associated with said multiplier circuits for providing control voltages for said servomechanism means for thereby adjusting the values of said adjustable magnitude to make them respectively equal to the roots of said equations; in said feedback loop, error calculating means comprising $n$ first sets, numbered from one to $n$, of $p$ reversible four terminal networks, numbered from one to $p$, having respective inputs and outputs, $n$ common outputs, numbered from one to $n$, respectively coupled to the outputs of the networks of said set having the same number, the inputs of said networks being coupled to said generator means having the same number, the respective transformation coefficients of said networks being in each set adjustable for simulating the respective coefficient values of said unknowns in the equation having the same number as said set for calculating the $n$ respective values of said $n$ equations upon respective incorporation therein of said electric magnitudes, thus providing $n$ error signals numbered from one to $n$; $n$ sets, numbered from one to $n$, of $p$ reversible transformers numbered from one to $p$, each transformer having inputs and outputs, the inputs of the transformer of said sets being respectively coupled in series to said common outputs having the same number as said set, for respectively collecting said error signals and the outputs of each transformer in each set being coupled in parallel to the transformer bearing the same number in each other set and to said control input of said servomechanism means bearing the same number, the respective transformation ratios of the transformers of each set simulating the coefficients of the unknowns in the equation having the same number as said set.

11. An equation computer for solving a system of $n$ linear equations, numbered from one to $n$, with $p$ unknowns, numbered from one to $p$, comprising: $p$ generator means, numbered from one to $p$, for providing adadjustable electric magnitudes, each simulating the unknown having the same number, said means having respective control inputs and outputs; a feedback loop associated with said generator means for adjusting the values of said magnitudes to make them respectively equal to the roots of said equations; in said feedback loop, error calculating means comprising $n$ first sets, numbered from one to $n$, of $p+1$ reversible four terminal networks having respective inputs and outputs, $n$ common outputs, numbered from one to $n$, each coupled to the outputs of said networks of that of said sets which has the same number, the inputs of said networks being respectively coupled to said generator means having the same number, the respective transformation coefficient of said networks being adjustable in each set for simulating the respective coefficient values of said unknowns in the equation having the same number as said set and to the value of the term of the equation having a constant value, means being provided for feeding to the input, of one network a voltage value taken as unity for simulating said term; $n$ second sets, numbered from one to $n$, of $p$ reversible four terminal networks, numbered from one to $p$, each network having inputs and outputs, the inputs of the networks of said second sets being respectively coupled to said common outputs having the same number for respectively collecting said error signals and the outputs of each four terminal networks in each set being coupled to the networks bearing the same number in each other set and to said control input of said generator means bearing the same number, the respective transformation coefficients of the networks of each of said second sets simulating the coefficients of the unknowns in the equation having the same number as said set.

12. An equation computer for solving a system of $n$ linear equations, numbered from one to $n$, with $p$ unknowns, numbered from one to $p$, comprising: $p$ multiplier circuits having adjustable multiplier coefficients, respective inputs for receiving a reference voltage taken as unity and respective outputs for providing adjustable magnitudes respectively simulating said unknown having the same number; $p$ servomechanism means, numbered from one to $p$, having respective control inputs, for respectively controlling said coefficients in said multiplier circuits; a feedback loop associated with said multiplier circuits for providing control voltages for said servomechanism means for thereby adjusting the values of said adjustable magnitude to make them respectively equal to the roots of said equations; in said feedback loop, error calculating means comprising $n$ sets, numbered from one to $n$, of $p+1$ reversible four terminal networks, numbered from one to $p+1$, having respective inputs and outputs, $n$ common outputs, numbered from one to $n$ respectively coupled to the outputs of the networks of said set having the same number, the inputs of said networks being coupled to said generator means having the same number, the respective transformation coefficients of said networks being in each set adjustable for simulating the respective coefficient values of said unknowns in the equations having the same number as said set and to the value of the term of the equations comprising no unknown value, means being provided for feeding to the input of one network a voltage value taken as unity for simulating said term, for calculating the $n$ respective values of said $n$ equations upon respective incorporation therein of said electric magnitudes, thus providing $n$ error signals numbered from one to $n$; $n$ second sets numbered from one to $n$, of $p$ reversible four terminal networks numbered from one to $p$, each network having inputs and outputs, the inputs of the network of said sets being respectively coupled to said common outputs having the same number as said set for respectively collecting said error signals and the outputs of each four terminal network in each set being coupled to the network bearing the same number in each other set and to said control input of said servomechanism means bearing the same number, the respective transformation coefficients of the networks of each set simulating the coefficients of the unknowns in the equation having the same number as said set.

References Cited by the Examiner

UNITED STATES PATENTS

| | | | |
|---|---|---|---|
| 2,476,747 | 7/49 | Lovell | 235—180 |
| 2,613,032 | 10/52 | Serrell et al. | 235—180 |
| 2,785,853 | 3/57 | Honore et al. | 235—193 |
| 2,805,823 | 9/57 | Raymond et al. | 235—180 |

OTHER REFERENCES

Page 1350, 1959, Sarbacher, Encyclopedic Dictionary of Electronics and Nuclear Engineering, Prentice-Hall.

MALCOLM A. MORRISON, *Primary Examiner.*

WALTER W. BURNS, Jr., ABRAHAM BERLIN,
*Examiners.*